US012673235B2

(12) United States Patent
Sepe, Jr.

(10) Patent No.: US 12,673,235 B2
(45) Date of Patent: Jul. 7, 2026

(54) IMMERSIVE PHYSIOLOGICAL TRACKING USING OPERATOR PHYSICAL STATE AND OPERATOR DEVICE STATE

(71) Applicant: ELECTRO STANDARDS LABORATORIES, Cranston, RI (US)

(72) Inventor: Raymond B Sepe, Jr., Medfield, MA (US)

(73) Assignee: Electro Standards Laboratories, Cranston, RI (US)

( * ) Notice: Subject to any disclaimer, the term of this patent is extended or adjusted under 35 U.S.C. 154(b) by 702 days.

(21) Appl. No.: 18/090,660

(22) Filed: Dec. 29, 2022

(65) Prior Publication Data

US 2024/0216751 A1     Jul. 4, 2024

(51) Int. Cl.
*A63B 22/02*          (2006.01)
*G06F 17/40*          (2006.01)

(52) U.S. Cl.
CPC .......... *A63B 22/02* (2013.01); *A63B 2225/50* (2013.01); *G06F 17/40* (2013.01)

(58) Field of Classification Search
CPC . A63B 22/02; A63B 2225/50; A63B 2220/30; A63B 22/0076; A63B 24/0087; A63B 2230/06; A63B 22/0605; A63B 2024/0093; A63B 22/0664; A63B 2225/20; G06F 17/40
See application file for complete search history.

(56) References Cited

U.S. PATENT DOCUMENTS

| | | | |
|---|---|---|---|
| 6,711,556 B1 | 3/2004 | Sepe, Jr. et al. | |
| 6,792,321 B2 | 9/2004 | Sepe, Jr. | |
| 7,166,062 B1 | 1/2007 | Watterson et al. | |
| 8,690,735 B2 | 4/2014 | Watterson et al. | |
| 10,532,000 B1 | 1/2020 | De Sapio et al. | |
| 10,952,671 B2 | 3/2021 | Greenwald et al. | |
| 11,141,092 B2 | 10/2021 | Stephens et al. | |
| 12,176,009 B2 | 12/2024 | Cox | |
| 2007/0219059 A1 | 9/2007 | Schwartz et al. | |

(Continued)

OTHER PUBLICATIONS

Schwartz, "The Speed and the Incline of the Treadmill and the Effect on Burning Calories," https://healthyliving.azcentral.com/speed-incline-treadmill-effect-burning-calories-9523.html, Oct. 27, 2021, pp. 1-3.

(Continued)

*Primary Examiner* — Christopher W Carter
(74) *Attorney, Agent, or Firm* — IP AUTHORITY, LLC; Ramraj Soundararajan

(57)          ABSTRACT
Unlike prior art systems that utilize a trainer who manually sets the user's device parameters such as speed, resistance, and incline to track the parameters of the trainer's device such as the trainer's device speed and, resistance, and incline; the disclosed novel system automatically controls the user's device parameters so that the physiological state of the user (e.g., the user's heart rate) tracks the physiological state of the trainer (e.g., the trainer's heart rate). Disclosed are physiological sensors that measure various biological conditions of the trainer and on the user and adds an immersion controller into the user's system that essentially uses the exercise devices as actuators that are adjusted in order to keep the user's physiological state tracking the trainer's physiological state.

27 Claims, 4 Drawing Sheets

(56)          References Cited

U.S. PATENT DOCUMENTS

| | | | | |
|---|---|---|---|---|
| 2010/0255955 A1* | 10/2010 | Hickman | ........... | A63B 22/0605 |
| | | | | 482/5 |
| 2012/0264570 A1* | 10/2012 | Watterson | .............. | G16H 80/00 |
| | | | | 482/8 |
| 2019/0283247 A1 | 9/2019 | Chang et al. | | |
| 2020/0254311 A1* | 8/2020 | Watterson | ............ | A63B 22/025 |
| 2020/0406119 A1* | 12/2020 | Woltermann | .......... | G11B 27/10 |
| 2021/0354002 A1* | 11/2021 | Schaefer | ............ | A63B 71/0622 |
| 2022/0143462 A1 | 5/2022 | Velo | | |
| 2023/0116214 A1 | 4/2023 | Fung | | |
| 2023/0215473 A1 | 7/2023 | Cox | | |
| 2023/0226412 A1 | 7/2023 | Nissila et al. | | |
| 2023/0377712 A1 | 11/2023 | Rosenberg et al. | | |

OTHER PUBLICATIONS

Munia et al., "Mental States Estimation with the Variation of Physiological Signals," 2012 International Conference on Informatics, Electronics & Vision (ICIEV), May 2012, pp. 800-805.
Kitagawa et al., "Mental States Estimation Using ECG Affected by Mood Change During Imagining the Near Future," 2019 IEEE 1st Global Conference on Life Sciences and Technologies (LifeTech), Mar. 2019, pp. 91-92.
Peltier et al., "Developing the Third Offset: Transcranial Direct Current Stimulation Can Improve the Human Operator," Military Medicine, Jan.-Feb. 2019, vol. 184, No. 1-2, pp. 11-13.
Dittert et al., Augmentation of Fear Extinction by Transcranial Direct Current Stimulation (tDCS), Frontiers in Behavioral Neuroscience, Apr. 25, 2018, 12(76), pp. 1-16.

* cited by examiner

IMMERSIVE PHYSIOLOGICAL TRACKING USING OPERATOR PHYSICAL STATE AND OPERATOR DEVICE STATE

BACKGROUND OF THE INVENTION

Field of Invention

The present invention relates generally to the field of remotely controlled exercise equipment. More specifically, the present invention is related to a system, method, and an article of manufacture for immersive physiological tracking using operator physical state and operator device state.

Discussion of Related Art

The widespread availability of high-speed Internet connections has enabled real-time remote learning and remote operation of various hardware or equipment. In the fitness industry, equipment such as exercise bikes, treadmills, rowing machines, elliptical bikes, climbers, and other types of devices are increasingly becoming network enabled allowing for a trainer to remotely lead a workout regimen with multiple participants that are not necessarily co-located.

U.S. Pat. No. 6,792,321 B2 discusses a system for real-time remote control of hardware over the Internet that can enable remote operation of exercise equipment by remotely controlling the embedded electromechanical motors and components that are used to adjust resistance, incline, speed, etc. of various fitness machines such as bikes, elliptical bikes, treadmills, climbers, and rowing machines.

U.S. Pat. No. 7,166,062 B1 discusses the remote interaction of fitness equipment with a remotely located trainer. The trainer adjusts the parameters of the user's exercise equipment in real-time to present the user with a customized workout.

FIG. 1 depicts the architecture of such prior art systems. The remotely located trainer can monitor the user's physical state (e.g., heart rate of the user) and the user's device state (e.g., speed and incline of the user's treadmill) via a data link over the Internet. The trainer may then adjust the speed and incline of his/her treadmill and reflect those parameter changes on the user's exercise device over the Internet. On the user's side of the communications link, the user's exercise device, a treadmill in this example, has its speed and incline set via the remote user parameters sent by the trainer and communicated to the user's device via the Internet. Often the trainer would set the incline and the speed of the user to follow that of his/her local exercise device but could make them different if he/she notices that the user's heart rate, for example, might be too high for a safe experience. In the prior art, the trainer is manually deciding what the parameters of the user's device should be and sets them.

While these prior art systems allow one or more users to have synchronized workouts with a remotely located trainer who can decide to adjust the parameters on each user's exercise equipment, none of them immerse the user in the same physiological experience as the trainer. The trainers may or may not be participating in the workout and, in any event, the users do not feel the same as the trainer during the workout. They do not share his physiological stress. Even if all the users are engaged on treadmills that are remotely controlled to be at the same speed and incline as the trainer, the stress on each person's body is not the same since all people sharing the session are not in the same physical condition. Factors such as age, weight, and prior training change the stress that each person feels during the same regimen. The present invention addresses these shortcomings by developing a system that allows users to get the same physiological experience as the remote operator, who is not necessarily a trainer.

Embodiments of the present invention are an improvement over prior art systems and methods.

SUMMARY OF THE INVENTION

In one embodiment, the present invention provides for a system comprising: (a) a processor; (b) a first set of sensors, the first set of sensors monitoring a physical state associated with an operator and outputting a first set of parameters representing the physical state; (c) a second set of sensors, the second set of sensors monitoring a device state associated with an exercise device and outputting a second set of parameters representing the device state; (d) a network interface forwarding both the first set of parameters and the second set of parameters to a remote user, and wherein an immersion controller, located remote from the system, receives the first set of parameters and the second set of parameters, and generates one or more device parameters to control a local exercise device based on the received first set of parameters and second set of parameters.

In another embodiment, the present invention provides a system comprising: (a) a network interface receiving a first set of parameters and a second set of parameters, the first set of parameters representing a first physical state associated with a remote operator and the second set of parameters representing a first device state associated with a remote exercise device; (b) an immersion controller associated with a local exercise device, the immersion controller: (i) receiving the first set of parameters and the second set of parameters from the network interface; (ii) receiving a third set of parameters from an exercise device controller associated with a local exercise device, the third set of parameters representing a second physical state associated with a user of the local exercise device; (iii) receiving a fourth set of parameters representing a second device state associated with the local exercise device; (iv) computing a fifth set of parameters from inputs received (i) through (iii), and (v) transmitting the fifth set of parameters to the exercise device controller; (c) the exercise device controller setting a sixth set of parameters in the local exercise device based on the received fifth set of parameters, the sixth set of parameters allowing the local exercise device to track both the first physical state of the remote operator and the first device state of the remote exercise device.

In yet another embodiment, the present invention provides a system comprising: (a) a network interface receiving a first set of parameters and a second set of parameters, the first set of parameters representing a first physical state associated with a remote operator and the second set of parameters representing a first device state associated with a remote exercise device; (b) an immersion controller associated with a local exercise device, the immersion controller comprising at least a first control channel and a second control channel, the first control channel receiving as input: the first set of parameters representing the first physical state associated with a remote operator and a third set of parameters representing the second physical state associated with a user of the local exercise device and outputting a first control channel output; and the second control channel receiving as input: the second set of parameters representing the first device state associated with the remote exercise device and a fourth set of parameters representing the second device state associated with the local exercise device and outputting second control channel output, wherein the immersion controller outputs the first control channel output and the second control channel output to an exercise device controller; and (c) the exercise device controller setting a fifth set of parameters in the local exercise device based on the received first and second control channel outputs, the fifth set of parameters allowing the local exercise device to track both the first physical state of the remote operator and the first device state of the remote exercise device such that the user of the local device is immersed in an experience of the remote operator.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
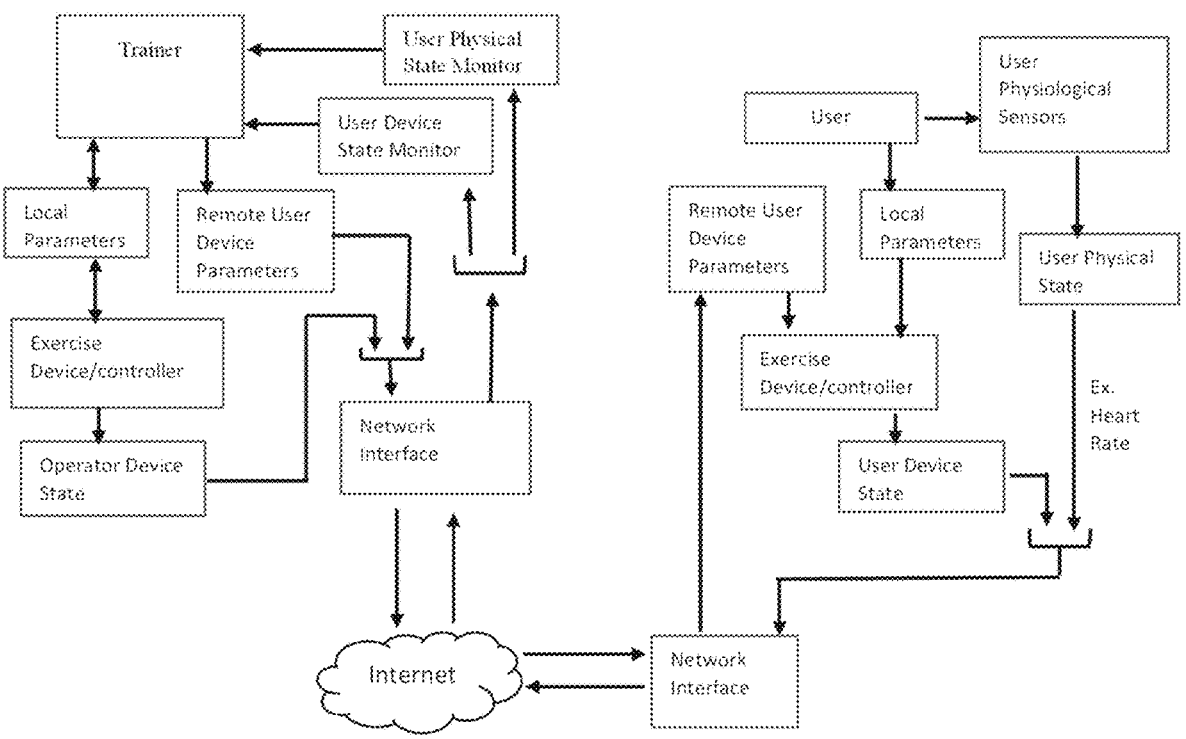
FIG. 1 depicts a prior art remote trainer exercise system.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention extends the state of the art for remotely controlled exercise equipment by fundamentally changing what is being tracked between the trainer's system and the user's system. Instead of prior art systems that utilize a trainer who manually sets the user's device parameters such as speed, resistance, and incline to track the parameters of the trainer's device such as the trainer's device speed, resistance, and incline, the new system presented here automatically controls the user's device parameters so that the physiological state of the user, such as the user's heart rate, tracks the physiological state of the trainer such as the trainer's heart rate.

The system of the present invention includes physiological sensors that measure various biological conditions of the trainer and the user and adds an immersion controller into the user's system that essentially uses the exercise devices as actuators that are adjusted to keep the user's physiological state tracking the trainer's physiological state. The physiological state can include any physiological quantity, or combination of quantities of interest, and includes, but is not limited to, heart rate, skin conductance, electrodermal activity, body or skin temperature, aerobic state, blood oxygen level, brain wave emissions, calories, and physical or mental stress.

Those versed in the state of the art will know that there are many types of sensors and methods of calculations that can be used to capture the biological states of a person. The specific types of sensors used and specific calculations employed should not be used to alter the scope of the invention. During exercise, sensors are commonly attached to operators with wrist bands, finger clips, headbands, head caps, and sticky-sided tape electrodes. There have also been advances in noncontact sensors based, for example, on non-contact temperature measurements or intelligent vision systems aimed at the person. The following representative sensors and calculations can be used in this application. The sensors are placed on both the trainer and the user such that both the remote and local operators have the same biological state(s) measured or deduced, e.g., both the trainer and the user having the same heart rate. Note that they do not necessarily need to be the same type of sensor or the same method of measurement as long as both produce output values that can be used to measure or deduce heart rate.

To measure heart rate, a Fitbit® wristband can be worn during exercise The Fitbit® converts heart rate into a numerical value that can be sent into the system wirelessly over, for example, the Internet or a Bluetooth connection. A Fitbit® can also be used to measure electrodermal activity, skin temperature, and electrocardiogram activity. Heart rate could also be measured by electrodes on sticky pads attached to the chest of the operator. The electrodes convert the heart rate to electrical signals that are input to the immersion controller, digitized by analog to digital converters into numerical values that are functions of heart rate. Similarly, skin conductance can be measured by two clip-based electrodes placed on the fingers or hands of the operator. The aerobic state can be calculated from heart rate measurements. One method of quantizing the aerobic state during exercise is to measure the heart rate as described above. Then, the aerobic state is taken to be proportional to the ratio of heart rate during exercise to heart rate while resting. The blood oxygen level can be measured during exercise by placing a fingertip in a pulse oximeter (clips on the finger). The pulse oximeter creates an electrical signal proportional to the oxygen saturation level in the operator's blood that can be digitized into a numeric value that is a function of blood oxygen level. Brain wave emissions can be measured during exercise using a soft head cap with electrodes distributed on the cap. Portable electroencephalogram (EEG) monitoring sensors on the cap create electrical signals proportional to brain waves that can be digitized for use by the system. Ocular patterns or eye movements can be used to infer physiological states. Smart glasses such as ETVision System from Argus Science can make pupil measurements and eyelid position measurements in real-time and can communicate that data with external devices. Force and pressure sensors integrated into handlebars or hand supports can measure grip force, and integrated into bike pedals, steps, and treadmill surfaces can measure foot pressure or foot impact forces. Specialized treadmills with pressure sensors such as the GHIWELL GHT2200 can measure gait patterns. External cameras trained on subjects during exercise can be used to recognize body movement patterns. Noninvasive sweat measurements from sensors worn on an armband such as the Eccrine Systems Sweatronics wearable can send real time sweat measurement data wirelessly to external devices. A small wearable device from Prana clips on a waistband to track posture and breathing. Audible emitted sounds can be measured by mounted or wearable microphones. A measure of physical stress can be calculated as the ratio of measured heart rate to maximum heart rate (previously recorded under stressful exercise). A measure of mental stress can be derived from measurements of brainwaves as ratios of brainwave component frequencies. The method of packaging the sensors does not change the essence of this invention. Advances in sensors that include wearable sensors and biometric-sensitive fabrics and materials can equally be applied here.

The immersion controller can control the exercise device, actuators within the exercise device, actuators in addition to or in place of the exercise devices that can effectively alter the user's physiological state. Such actuators can include, but are not limited to, any combination of exercise devices, electromechanical actuators, audio devices, visual devices, scent releasing or scent emulating or stimulating devices, and mechanical and electrical stimulation devices.

Typical actuators embedded in a treadmill are speed from an embedded motor and incline controlled by an embedded incline motor. Typical actuators for an exercise bike are incline controlled by an incline motor, and resistance controlled by an electromechanically controlled friction brake or a magnetic brake. Note that dynamically controlling resistance such that the product of resistance and speed is regulated effectively controls power.

The present invention can include a trainer but more generically includes a remote operator instead of a trainer. The users will be immersed in the same physiological experience as the remote operator who could be running a marathon, biking in a race, or participating in some other activity of interest.

Figure 2A:
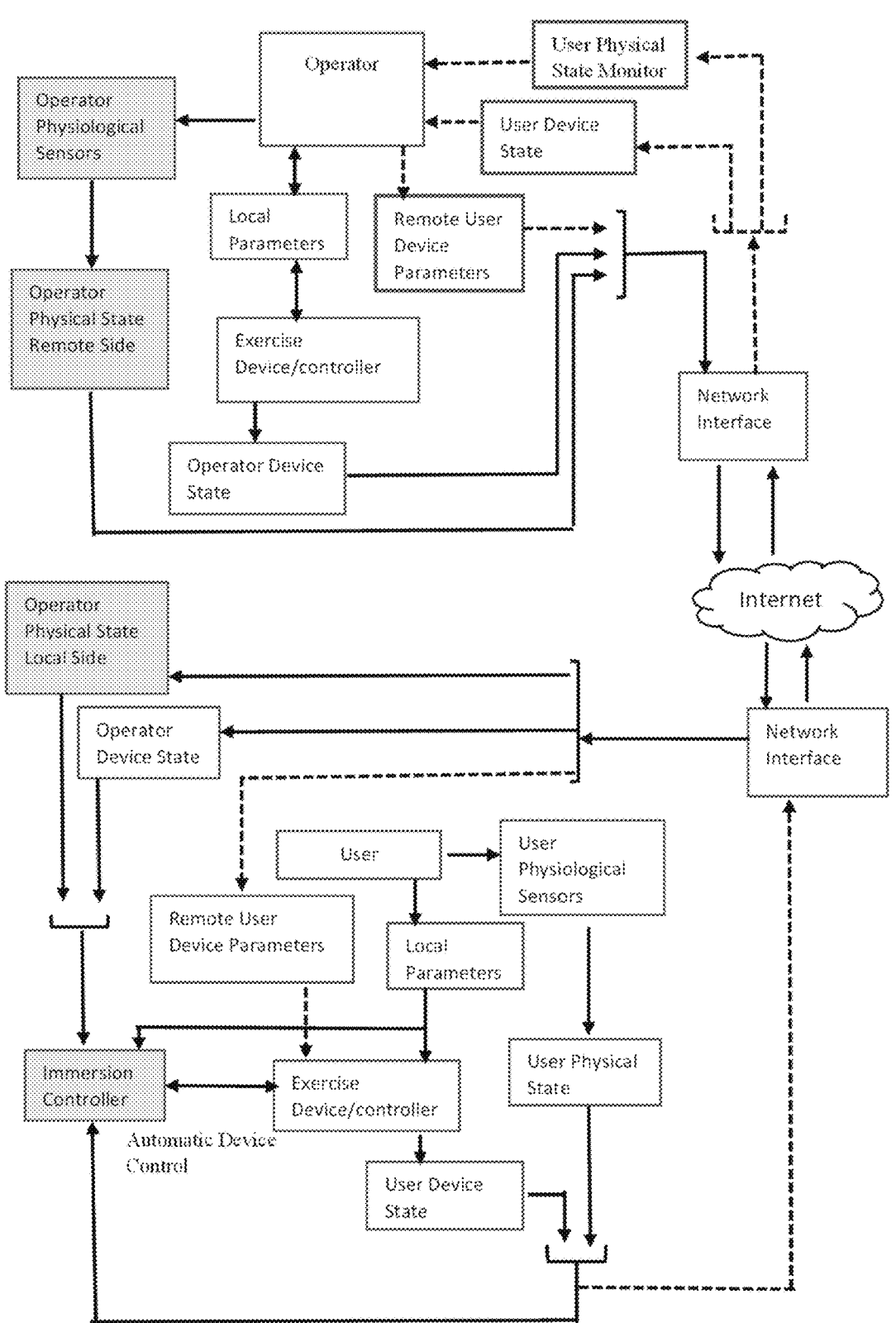
FIG. 2A depicts an embodiment of the present invention with remote physical state tracking.

One embodiment of the present invention is illustrated in FIG. 2A in which the remote operator's physical state is tracked by the user in real-time. The remote trainer included in the prior art shown in FIG. 1 has been replaced by the more generic remote "operator" who may or may not be a trainer. If the remote operator is a trainer, then the "User Physical State Monitor" (from FIG. 1), the "User Device State Monitor" (from FIG. 1), and the "Remote User Device Parameters" (from FIG. 1) are included showing that the trainer can manually monitor the remote user and adjust the parameters of the remote user's device. However, in this embodiment of the present invention, those elements can optionally be removed from the system as indicated by the dotted lines. The operator can be located in a geographically different spot than the user, where the operator may be participating in some physical event, such as biking through a path. The operator's physical state (labeled "Operator Physical State Remote) can be measured (using, for example, the Operator Physiological Sensors) in situ during the event, and the Operator Device State may also be simultaneously measured (e.g., as measured by the Exercise/ Device Controller). For example, the heart rate and pedal power of the operator can be measured along with the speed and incline of the bike being used in the event. Those measurements can be collected automatically without interference from the operator. In general, one or more operator physiological sensors such as heart rate, skin conductance, skin temperature, blood oxygenation level, ECG, EEG sensors, etc. can be used to gather physiological data. That data is conditioned and may be used individually or in mathematical or heuristic combinations in the Operator Physical State Remote Side to provide estimates of the Operator's physiological state. "Conditioned" as used herein refers to using well-known signal processing techniques such as scaling to account for different signal amplitudes and different sensor sensitivities, and filtering to remove signal interference and sensor noise. Those versed in the state of the art will recognize the types of physiological sensors available and the use of multimodalities and multiple sensors to improve the accuracy of the operator's physiological state estimation. That information is sent via the Internet to the User side of the Internet link.

On the user side of the Internet interface, the Operator's Physical State and Device State are sent to the Immersion Controller. The Immersion Controller is responsible for signals sent to the User's Exercise Device/Controller such that the Operator Physical State and/or the Operator Device State information is tracked by the User and/or the User's exercise device.

Figure 2B:
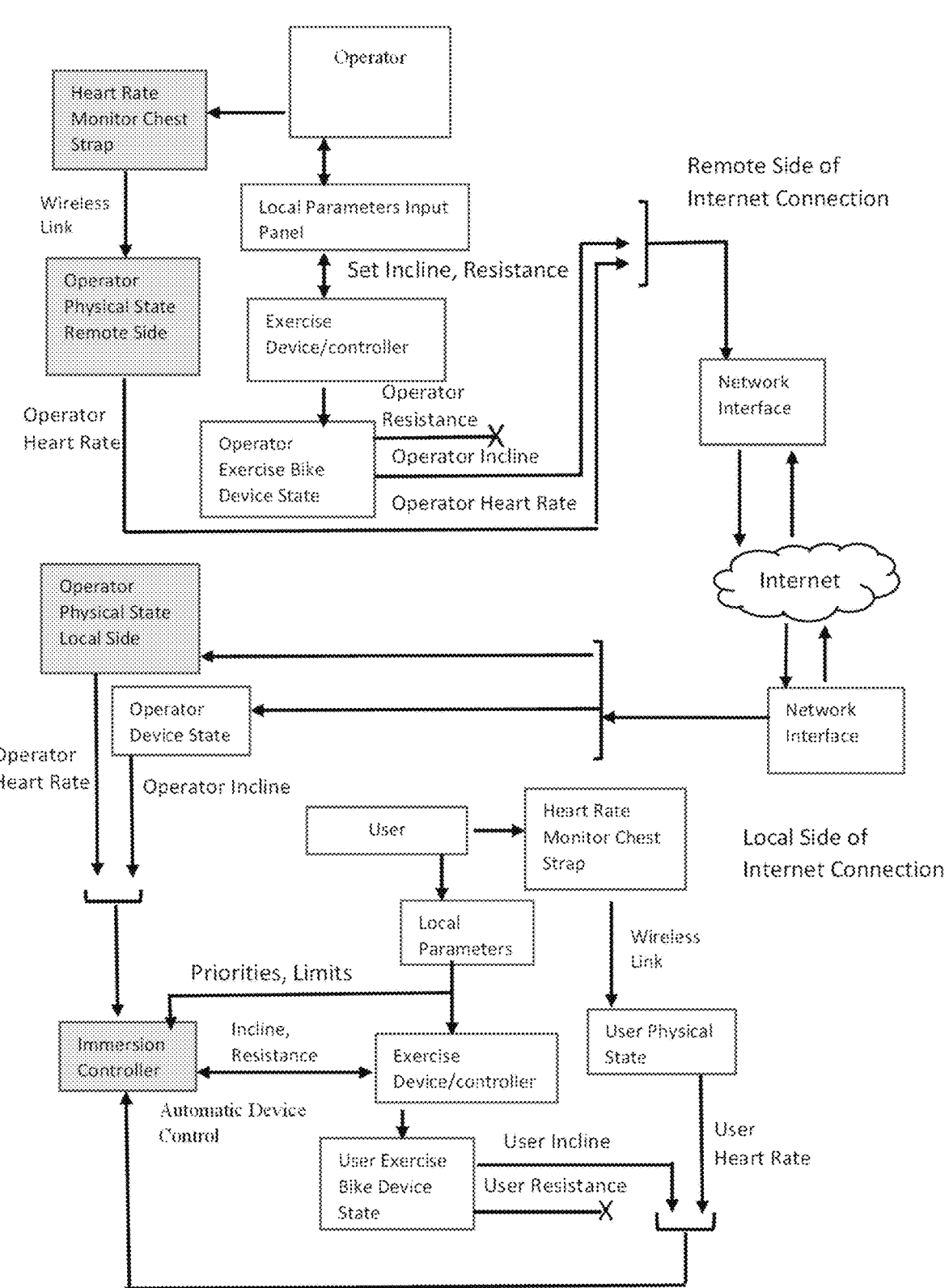
FIG. 2B depicts an example of the present invention's system to track an Operator's heart rate and bike incline using an exercise bike.

For explanation purposes, FIG. 2B illustrates a particular case for the system of FIG. 2A in which a remote operator is on an exercise bike and the local User is also on an exercise bike. On the Operator side, the optional User Physical State Monitor, User Device State, and Remote User Device Parameters subsystems shown in FIG. 2A are not used. On the User side, the "Remote User Device Parameters" block is not used since the remote Operator is not manually setting the local exercise bike parameters, and the "User Device State" and "User Physical State" are not sent over the Network Interface because they are not used on the remote side of the system. The desired operation is to have the local User's exercise bike track the incline of the remote exercise bike and to have the heart rate of the local User track the heart rate of the remote Operator. The types of sensors and methods of interconnection and communicating data described below are not meant to be exhaustive but are presented without loss of generality to provide a clear discussion of some of the important features embodied in the present invention.

In the example of FIG. 2B, the Operator's heart rate is monitored by a Heart Rate Monitor Chest Strap that is wrapped around the torso of the Operator, where the sensed heart rate is continuously sent over, for example, a Bluetooth link. A commercially available Garmin® HRM dual heart rate monitor is one such example of that device. The Operator Physical State Remote Side receives that streaming heart rate data and routes it to the Network Interface. The Operator's exercise bike incline is measured on the exercise bike and routed to the Network Interface. The Network Interface sends the real-time streaming Operator's heart rate and the real-time streaming Operator's bike incline over the Internet to the Network Interface on the local User's side of the link. Note that there can be one or many local users. The Network Interface on the local side of the Internet sends data to the Operator Physical State Local Side that then extracts the streaming Operator Heart Rate data. It also sends data to the Operator Device State that extracts the Operator's bike incline. Both data are sent to the Immersion Controller whose job is to send real-time incline and resistance commands to the user's Exercise Device/Controller. The Immersion controller continually adjusts the incline and resistance commands in order to track the incline and heart rate of the Operator. The Exercise Device/Controller uses the local exercise bike's actuators to dynamically adjust the bike's incline and resistance to track the incline and resistance profiles coming from the Immersion Controller. Typically, local bike actuators can include an electric motor that adjusts the bike's incline and an electric motor that adjusts a friction pad/belt or an electromagnetic friction brake that can adjust the bike's resistance to pedaling. The Local Parameters in this case set the Immersion controller priorities that weight the control authority of the heart rate tracking versus the incline tracking. For example, if heart rate is higher priority, then that control loop is tuned to be more responsive than the incline tracking. One way to accomplish this is to scale down the gains of the incline tracking controller. This has the effect of reducing interactions between the control loops. In addition, limits are sent to the Immersive controller and device controller such that the incline and heart rate tracking is bounded to be within safe limits for the User.

In FIG. 2B, the remote Operator is on an exercise bike. Note that the local and remote operators don't need to be on the same type of equipment and that this invention also applies to in-situ real-time tracking of the remote operator while not necessarily on exercise equipment. For example, the remote operator could be riding a bike over a path while the local user can be on an exercise bike that is controlled via this invention such that the local User's exercise bike tracks the remote Operator's bike incline and the local User's heart rate tracks the remote Operator's heart rate. For this case, the remote Operator would be riding a bike that is instrumented to measure incline as the operator traverses pathways. This could be a direct measurement of the incline using an inclinometer, or the incline could be inferred by using a GPS device that tracks the operator's location and then correlates that location with the incline using a contour map of the pathway. In either case, the result is that the bike's real-time incline is streamed along with the Operator's heart rate. Similarly, the remote user could be running over a pathway using the heart rate monitor chest strap and the GPS contour map inferred incline. The local user could be on the exercise bike as described previously or on another piece of equipment such as a treadmill outfitted with the immersion control system.

Figure 3:
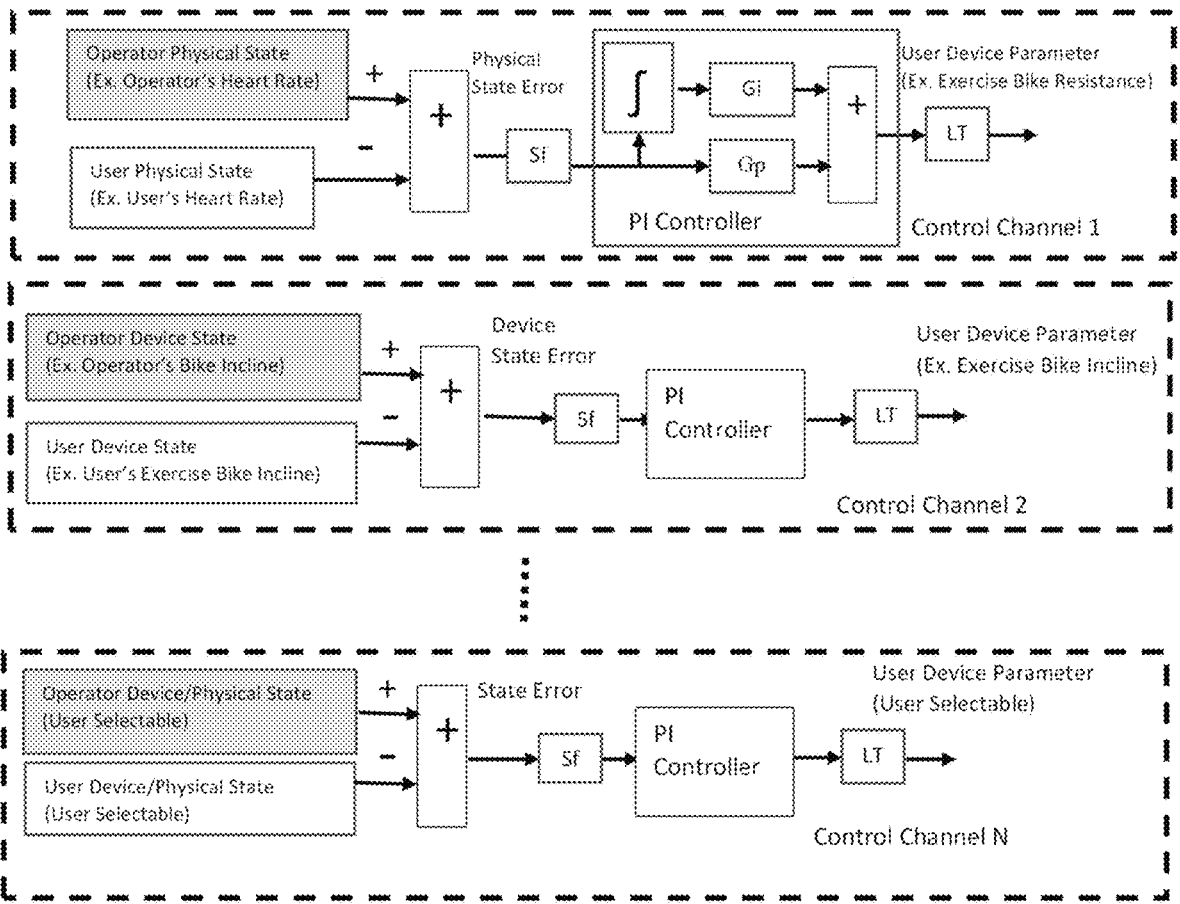
FIG. 3 depicts an Immersion Controller of the present invention.

One embodiment of the Immersion Controller is shown in FIG. 3. It consists of one or more control channels in which each control channel sends commands to the User Exercise Device/Controller to make adjustments such that the state of the User tracks the state of the Operator. The blocks with "+" are summation, ∫ is a mathematical integrator, and the PI Controller is shown in standard form with the error signal multiplied by a proportional gain Gp and the integral of the error multiplied by an integral gain Gi, both of which are summed into an output signal. Those versed in the state of the art will recognize the PI controller and understand that other types of controllers can be used in its place. The tuning of PI controllers (selection of Gp and Gi) is well documented in the industry, and a beneficial characteristic of this type of controller is that it works to drive the error signal to zero which results in good tracking control. To prioritize control channels, a scale factor Sf can be used to speed up or slow down the controllers' response times. This can be useful when more than one control channel affects the user's state. Sf greater than one tends to speed up response on that control channel while Sf less than one tends to slow down the response of that control channel. Other methods of reducing loop interactions can be found in the literature on control systems. The LT block on the output of the PI Controller represents an output limiter that can be used to bound the output command within safe and desirable limits. Other methods of output limiting can be found in the literature on control systems.

Control Channel 1 inputs a numerical value representing the Operator Physical State, for example the Operator's Heart Rate, and subtracts it from a numerical value representing the User Physical State, the User's Heart Rate, to generate a Physical State Error. Whenever the Operator's heart rate is faster than the User's heart rate, the Physical State Error is positive. That error is input to a control algorithm such as a PI Controller to generate a signal that changes the User Device Parameter. In this example, the User's exercise bike resistance is increased when that error is positive. Increasing the bike's resistance will cause the User to exert more effort on the bike and thus increase the User's heart rate (see for example, the article by J. Schwartz titled "The Speed and Incline of the Treadmill and the Effect on Burning Calories".). This closed-loop control channel will continuously adjust the bike's resistance such that the User's heart rate will track that of the Operator.

It should be noted that the PI Controller is known to those versed in the state of the art for control systems and other types of control systems also known to those versed in the state of the art for controls can be used without changing the overall operation of the system. It should also be noted that the example of an exercise bike is for clarity of the present discussion. Still, other types of user devices could be used such as treadmills, stair masters, rowing machines, elliptical devices, etc. without changing the effectiveness or the spirit of the invention.

Control Channel 2 inputs the Operator Device State, for example, the Operator's Bike incline and subtracts it from the User Device State, the User's Bike incline, to generate a Device State Error. Whenever the Operator's bike incline is higher than the User's bike incline, the Device State Error is positive. That error is input to a control algorithm such as a PI Controller to generate a signal that changes the User Device Parameter. In this example, the User's exercise bike incline is increased. This closed-loop control channel will continuously adjust the bike's incline such that the User's bike incline will track that of the Operator.

It should be noted that the PI Controller is known to those versed in the state of the art for control systems and other types of control systems also known to those versed in the state of the art for controls can be used without changing the overall operation of the system. Other types of control systems such as optimal control, deep learning, neural networks or artificial intelligence, fuzzy logic, or model-based control, adaptive control, and nonlinear control among others.

It should also be noted that the example of an exercise bike is for clarity of discussion. Still, other types of user devices could be used such as treadmills, stair masters, rowing machines, elliptical devices, etc. without changing the effectiveness or the spirit of the invention.

When tracking heart rate in this example, resistance is varied, and when tracking incline, the incline of the local bike is varied. It should be noted that the degree of incline on the exercise bike will also affect heart rate since it increases the effort expended on the bike. Thus, in this example, the control loops are not completely independent in their effect on the user. To prioritize incline, the gains on the heart rate controller are scaled down using a scale factor of less than one. This has the effect of allowing the incline to reach its target value first and then the resistance is adjusted slowly to more finely adjust the bike's resistance such that the overall heart rate tracking is achieved. Other methods of coordinated control are also possible such as utilizing a multi-input multi-output controller structure in place of separate PI controllers or running controllers in an interleaved fashion. These and similar methods can be found in the literature.

As shown in this example, it is possible to simultaneously track Operator physical and device states, depending upon the physical and device states chosen to be tracked and the number of degrees of freedom available on the user's side that can be used to adjust the user's device or affect the user's physical state. In this example, the immersion controller uses heart rate and incline. Without loss of generality, the immersion controller could be used to track other combinations of Operator signals such as skin conductance (sweat) and bike power, heart rate and skin conductance, blood oxygen level and power, and power and incline. If the User equipment was a treadmill instead of a bike, the tracking could include incline and speed, for example. In general, the immersion controller can have N-channels of control, and each channel of control can have a user-selectable device or physical state such that the User can decide beforehand or in real-time to change which and how many operator state signals are being tracked by the User. This generality is indicated in FIG. 3 as shown in Control Channel N.

The immersion controller can be implemented as control software that is an enhancement to the exercise device's controller software or it can be part of a separate unit with its own processor and control software. Those versed in the state of the art for hardware design and control systems can envision a variety of such implementation combinations without changing the essence of this invention.

Note that this invention does not restrict the system to only a single physical device on the User's side, nor does the device on the User's side necessarily need to be the same type or number of devices as on the Operator's side. For example, the changing heart rate of the operator running down a path could be mirrored on a User who is on an exercise bike by automatically adjusting the bike's incline or resistance, but a treadmill or Stairmaster exercise unit could also be used as a way of adjusting a User's heart rate.

It should be noted that this invention does not restrict the system such that a remote operator is necessary. In another embodiment, in the absence of a remote operator, the local User can set a desired target physiological state in place of the physiological state from the remote Operator. In that case, the closed-loop system will adjust the local device in order to track the desired target setpoint or profile. For example, the local User could set a particular heart rate as his/her target heart rate that he/she wants to reach on the bike. The bike's resistance would be varied automatically by the immersion controller in order to track the desired heart rate profile such that his/her own heart rate follows the profile.

It should also be noted that although the system is capable of directly mirroring the Operator's physiological state to the User, it may be desirable to track the Operator's state but at a lesser level or higher level depending upon the relative fitness between the Operator and the User. Thus, without loss of generality, the system can track a function of the Operator's physical and device state. That function can follow the Operator but may be at a scaled-down or up value as desired. It may also be desirable to mirror or track a subset of the available parameters. The present invention is capable of allowing selections of parameters and this is within the spirit of the present invention.

In one embodiment, the present invention provides for an automated biofeedback system comprising: (a) a processor; (b) a first set of sensors, the first set of sensors monitoring a physical state associated with an operator and outputting a first set of parameters representing the physical state; (c) a second set of sensors, the second set of sensors monitoring a device state associated with an exercise device and outputting a second set of parameters representing the device state; (d) a network interface forwarding both the first set of parameters and the second set of parameters to a remote user, and wherein an immersion controller, located remote from the system, receives the first set of parameters and the second set of parameters, and generates one or more device parameters to control a local exercise device based on the received first set of parameters and second set of parameters.

In another embodiment, the present invention provides an automated biofeedback system comprising: (a) a network interface receiving a first set of parameters and a second set of parameters, the first set of parameters representing a first physical state associated with a remote operator and the second set of parameters representing a first device state associated with a remote exercise device; (b) an immersion controller associated with a local exercise device, the immersion controller: (i) receiving the first set of parameters and the second set of parameters from the network interface; (ii) receiving a third set of parameters from an exercise device controller associated with a local exercise device, the third set of parameters representing a second physical state associated with a user of the local exercise device; (iii) receiving a fourth set of parameters representing a second device state associated with the local exercise device; (iv) computing a fifth set of parameters from inputs received (i) through (iii), and (v) transmitting the fifth set of parameters to the exercise device controller; (c) the exercise device controller setting a sixth set of parameters in the local exercise device based on the received fifth set of parameters, the sixth set of parameters allowing the local exercise device to track both the first physical state of the remote operator and the first device state of the remote exercise device.

In yet another embodiment, the present invention provides an automated biofeedback system comprising: (a) a network interface receiving a first set of parameters and a second set of parameters, the first set of parameters representing a first physical state associated with a remote operator and the second set of parameters representing a first device state associated with a remote exercise device; (b) an immersion controller associated with a local exercise device, the immersion controller comprising at least a first control channel and a second control channel, the first control channel receiving as input: the first set of parameters representing the first physical state associated with a remote operator and a third set of parameters representing the second physical state associated with a user of the local exercise device and outputting a first control channel output; and the second control channel receiving as input: the second set of parameters representing the first device state associated with the remote exercise device and a fourth set of parameters representing the second device state associated with the local exercise device and outputting second control channel output, wherein the immersion controller outputs the first control channel output and the second control channel output to an exercise device controller; and (c) the exercise device controller setting a fifth set of parameters in the local exercise device based on the received first and second control channel outputs, the fifth set of parameters allowing the local exercise device to track both the first physical state of the remote operator and the first device state of the remote exercise device such that the user of the local device is immersed in an experience of the remote operator.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray© discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method have been shown in the above embodiments for the effective implementation of a system, method and article of manufacture for immersive physiological tracking using operator physical state and operator device state. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:
1. A system comprising:
a processor associated with a remote exercise device;
a first set of sensors, the first set of sensors monitoring a physical state associated with a remote operator and outputting a first set of parameters representing the physical state, the first set of parameters comprising at least one physiological parameter;
a second set of sensors, the second set of sensors monitoring a device state associated with the remote exercise device and outputting a second set of parameters representing the device state; and
a network interface communicatively coupled to the processor, the network interface transmitting, over a net- work, the first set of parameters; and the second set of parameters to an immersion controller;

wherein the immersion controller is associated with a local exercise device, the immersion controller:

receives the first set of parameters and the second set of parameters via the network, receives a third set of parameters representing a device state associated with the local exercise device;

receives a fourth set of parameters representing a physiological state associated with a user of the local exercise device;

determines a physiological-state error based on a difference between the at least one physiological parameter of the first set of parameters and a corresponding physiological parameter of the fourth set of parameters;

determines a device-state error based on a difference between a first device parameter of the second set of parameters and a corresponding second device parameter of the third set of parameters;

generates one or more control parameters by applying one or more feedback control algorithms to the physiological-state error and the device-state error; and transmits the one or more control parameters to an exercise device controller associated with the local exercise device;

wherein the exercise device controller controls the local exercise device using the received one or more control parameters to adjust one or more actuators of the local exercise device such that the corresponding physiological parameter of the fourth set of parameters tracks the at least one physiological parameter of the first set of parameters and the corresponding second device parameter of the third set of parameters tracks the first device parameter of the second set of parameters.

2. The system of claim 1, wherein the remote operator is a trainer.

3. The system of claim 1, wherein the first and second sets of parameters are forwarded over the Internet.

4. The system of claim 1, wherein the remote exercise device and the local exercise device can be picked from any of the following: a bike, a treadmill, a rowing machine, an elliptical bike, a stair master, a variable resistance climber, or a vibration platform.

5. The system of claim 4, wherein the remote exercise device is different than the local exercise device.

6. The system of claim 1, wherein the first set of parameters and the fourth set of parameters representing the physical state associated with the remote operator and the physiological state associated with the user of the local exercise device, respectively, are detected via in-situ non-invasive measurements.

7. The system of claim 1, wherein the first set of parameters are any of, or a combination of, the following: heart rate, skin conductance, breathing rate and respiratory patterns, aerobic state, blood oxygen level, brain wave emissions, stress measurements, calories, body or skin temperature, ocular patterns, gait patterns, foot impact, body movement and posture, audible and emitted sounds, gripping pressure, sweat, visual indicators, and parameters derived from combinations of measurements and calculations.

8. The system of claim 1, wherein the second set of parameters are any of, or a combination of, the following: power, incline, speed, acceleration, distance, resistance, vibration, and step size.

9. A system comprising:
(a) a processor associated with a local exercise device;
(b) a first set of sensors, the first set of sensors monitoring a physiological state associated with a user of the local exercise device and outputting a first set of parameters representing the physiological state;
(c) a second set of sensors, the second set of sensors monitoring a device state associated with the local exercise device and outputting a second set of parameters representing the device state;
(d) a network interface communicatively coupled to the processor, the network interface receiving, over a network, a third set of parameters and a fourth set of parameters, the third set of parameters representing a physical state associated with a remote operator, the third set of parameters comprising at least one physiological parameter, and the fourth set of parameters representing a device state associated with a remote exercise device;
(e) an immersion controller associated with a local exercise device;
wherein the immersion controller is associated with the local exercise device the immersion controller:
(i) receives the first set of parameters, the second set of parameters, the third set of parameters, and the fourth set of parameters;
(ii) determines a physiological-state error based on a difference between the at least one physiological parameter of the third set of parameters and a corresponding physiological parameter of the first set of parameters;
(iii) determines a device-state error based on a difference between a first device parameter of the fourth set of parameters and a corresponding second device parameter of the second set of parameters;
(iv) generates one or more control parameters by applying one or more feedback control algorithms to the physiological-state error and the device-state error; and
(v) transmits the one or more control parameters to an exercise device controller associated with the local exercise device;
wherein the exercise device controller controls the local exercise device using the received one or more control parameters to adjust one or more actuators of the local exercise device such that the corresponding physiological parameter of the first set of parameters tracks the at least one physiological parameter of the third set of parameters and the corresponding second device parameter of the second set of parameters tracks the first device parameter of the fourth set of parameters.

10. The system of claim 9, wherein the immersion controller comprises:
at least a first control channel and a second control channel;
the first control channel receiving as input the third set of parameters representing the physical state associated with the remote operator and the first set of parameters representing the physiological state associated with the user of the local exercise device and outputting a fifth set of parameters; and
the second control channel receiving as input the fourth set of parameters representing the device state associated with the remote exercise device and the second set of parameters representing the device state associated with the local exercise device and outputting an sixth set of parameters, wherein the fifth set of parameters and the sixth set of parameters collectively comprise the one or more control parameters.

11. The system of claim 10, wherein each control channel comprises a proportional integral (PI) controller.

12. The system of claim 9, wherein the remote operator is a trainer.

13. The system of claim 9, wherein the third set of parameters and the fourth set of parameters are received over the Internet.

14. The system of claim 9, wherein the remote exercise device and the local exercise device are picked from any of the following: a bike, a treadmill, a rowing machine, an elliptical bike, a stair master, a variable resistance climber, or a vibration platform.

15. The system of claim 14, wherein the remote exercise device is different than the local exercise device.

16. The system of claim 9, wherein the third set of parameters representing the physical state associated with the remote operator and the first set of parameters representing the physiological state associated with the user of the local exercise device are detected via in-situ noninvasive measurements.

17. The system of claim 9, wherein the first set of parameters are any of, or a combination of, the following: heart rate, skin conductance, breathing rate, and respiratory patterns, aerobic state, blood oxygen level, brain wave emissions, stress measurements, calories, body or skin temperature, ocular patterns, gait patterns, foot impact, body movement and posture, audible and emitted sounds, gripping pressure, sweat, visual indicators and parameters derived from combinations of measurements and calculations.

18. The system of claim 9, wherein the second set of parameters are any of, or a combination of, the following: power, incline, speed, acceleration, distance, resistance, vibration, and step size.

19. A system comprising:

(a) a network interface receiving a first set of parameters and a second set of parameters, the first set of parameters representing a first physical state associated with a remote operator and the second set of parameters representing a first device state associated with a remote exercise device;

(b) a local exercise device;

(c) an exercise device controller associated with the local exercise device;

(d) an immersion controller associated with the local exercise device, the immersion controller comprising at least a first control channel and a second control channel, the first control channel receiving as input the first set of parameters representing the first physical state associated with a remote operator and a third set of parameters representing a second physical state associated with a user of the local exercise device and outputting a first control channel output, wherein the first control channel output is generated by determining a physiological-state error based on a difference between a first physiological parameter of the first set of parameters and a corresponding second physiological parameter of the third set of parameters, and applying a feedback control algorithm to the physiological-state error; and the second control channel receiving as input the second set of parameters representing the first device state associated with the remote exercise device and a fourth set of parameters representing a second device state associated with the local exercise device and outputting a second control channel output, wherein the second control channel output is generated by determining a device-state error based on a difference between a first device parameter of the second set of parameters and a corresponding second device parameter of the fourth set of parameters, and applying a feedback control algorithm to the device-state error;

wherein the immersion controller outputs the first control channel output and the second control channel output to the exercise device controller; and (e) the exercise device controller controlling the local exercise device using the received first control channel output and the received second control channel output by setting a fifth set of parameters in the local exercise device based on the received first and second control channel outputs, the fifth set of parameters allowing the local exercise device to track both the first physical state of the remote operator and the first device state of the remote exercise device such that the user of the local exercise device is immersed in an experience of the remote operator, wherein the corresponding second physiological parameter tracks the first physiological parameter and the corresponding second device parameter tracks the first device parameter.

20. The system of claim 19, wherein each control channel comprises a proportional integral (PI) controller.

21. The system of claim 19, wherein the remote operator is a trainer.

22. The system of claim 19, wherein the first and second sets of parameters are received over the Internet.

23. The system of claim 19, wherein the remote exercise device and the local exercise device are picked from any of the following: a bike, a treadmill, a rowing machine, an elliptical bike, a stair master, a variable resistance climber, or a vibration platform.

24. The system of claim 23, wherein the remote exercise device is different than the local exercise device.

25. The system of claim 19, wherein the first set of parameters representing the first physical state associated with the remote operator and the third set of parameters representing the second physical state associated with the user of local exercise device are detected via in-situ noninvasive measurements.

26. The system of claim 19, wherein the first set of parameters are any of, or a combination of, the following: heart rate, skin conductance, breathing rate and respiratory patterns, aerobic state, blood oxygen level, brain wave emissions, stress measurements, calories, body or skin temperature, ocular patterns, gait patterns, foot impact, body movement and posture, audible and emitted sound patterns, gripping pressure, sweat, visual indicators and parameters derived from combinations of measurements and calculations.

27. The system of claim 19, wherein the second set of parameters are any of, or a combination of, the following: power, incline, speed, acceleration, distance, resistance, vibration, and step size.

* * * * *